US012014066B2

(12) United States Patent
Van Alstyne et al.

(10) Patent No.: US 12,014,066 B2
(45) Date of Patent: Jun. 18, 2024

(54) SELECTIVE USE OF HIGH-PERFORMANCE MEMORY IN A SOFTWARE DEFINED SYSTEM

(71) Applicant: SOFTIRON LIMITED, Chilworth (GB)

(72) Inventors: Kenny Van Alstyne, Mechanicsville, VA (US); Phillip Edward Straw, Newark, CA (US)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 17/902,598

(22) Filed: Sep. 2, 2022

(65) Prior Publication Data
US 2023/0273739 A1    Aug. 31, 2023

Related U.S. Application Data

(60) Provisional application No. 63/241,828, filed on Sep. 8, 2021.

(51) Int. Cl.
*G06F 3/06* (2006.01)
(52) U.S. Cl.
CPC ............ *G06F 3/065* (2013.01); *G06F 3/0604* (2013.01); *G06F 3/0634* (2013.01); *G06F 3/067* (2013.01)

(58) Field of Classification Search
CPC ...... G06F 3/065; G06F 3/0604; G06F 3/0634; G06F 3/067; G06F 2212/286; G06F 12/0238
See application file for complete search history.

(56) References Cited

U.S. PATENT DOCUMENTS

| | | | |
|---|---|---|---|
| 9,880,933 B1* | 1/2018 | Gupta | G06F 3/0656 |
| 2013/0276123 A1* | 10/2013 | Thadikaran | G06F 21/56 726/24 |
| 2016/0378713 A1 | 12/2016 | Kaimalettu et al. | 709/212 |
| 2021/0081432 A1 | 3/2021 | Grunwald et al. | |
| 2021/0141658 A1* | 5/2021 | Sahita | G06F 21/44 |
| 2022/0121546 A1* | 4/2022 | Chawla | G06F 11/302 |

OTHER PUBLICATIONS

International Search Report and Written Opinion, Application No. PCT/EP2022/075046, 12 pages.

* cited by examiner

*Primary Examiner* — Jason W Blust
(74) *Attorney, Agent, or Firm* — Slayden Grubert Beard PLLC (57) ABSTRACT

A system includes control logic to boot to a waking state, configure the system, and check for the presence of non-volatile DIMMs. Based on a determination that non-volatile DIMMs are not present, the control logic is to create one or more block devices to overcome CPU utilization limitations. Based on a determination that non-volatile DIMMs are present, the control logic is to use a non-volatile DIMM for storage.

26 Claims, 3 Drawing Sheets

SELECTIVE USE OF HIGH-PERFORMANCE MEMORY IN A SOFTWARE DEFINED SYSTEM

PRIORITY

This application claims priority to U.S. Provisional Patent Application No. 63/241,828 filed Sep. 8, 2021, the contents of which are hereby incorporated in their entirety.

FIELD OF THE INVENTION

The present disclosure relates to memory management in electronic devices and, particularly, to selective use of high-performance memory in a software defined storage system (SDS).

BACKGROUND

Hardware accelerators, such as graphical processing units (GPUs), are frequently used in various high performance computing (HPC) workloads, including artificial intelligence (AI)/machine learning (ML)/deep learning (DL), due to the GPU's ability to handle great numbers of parallel tasks. This highly parallelized nature can lead to an ominous situation of the storage, either being read from or written to, being the bottleneck for continuous 100% utilization of the hardware accelerators' processing capability.

The industry standard method for overcoming this issue is to use very fast persistent local storage, such as NVMe, as the storage medium for input and output data for these workloads. Inventors of embodiments of the present disclosure have discovered that there are still several drawbacks for this method as well. For some workloads, even where hardware accelerators are very well suited, this may still be a bottleneck for the hardware accelerator. The likelihood of this being true is multiplied if multiple hardware accelerators in the same node are participating in the data processing workload. Another drawback is that the local high speed storage acts as a storage "island", segregated from the remainder of other storage in the compute environment. This may necessitate a manual seed process to exist as well as manually copying the resulting data to a location away from this local storage "island" in an SDS system.

DETAILED DESCRIPTION

Figure 1:
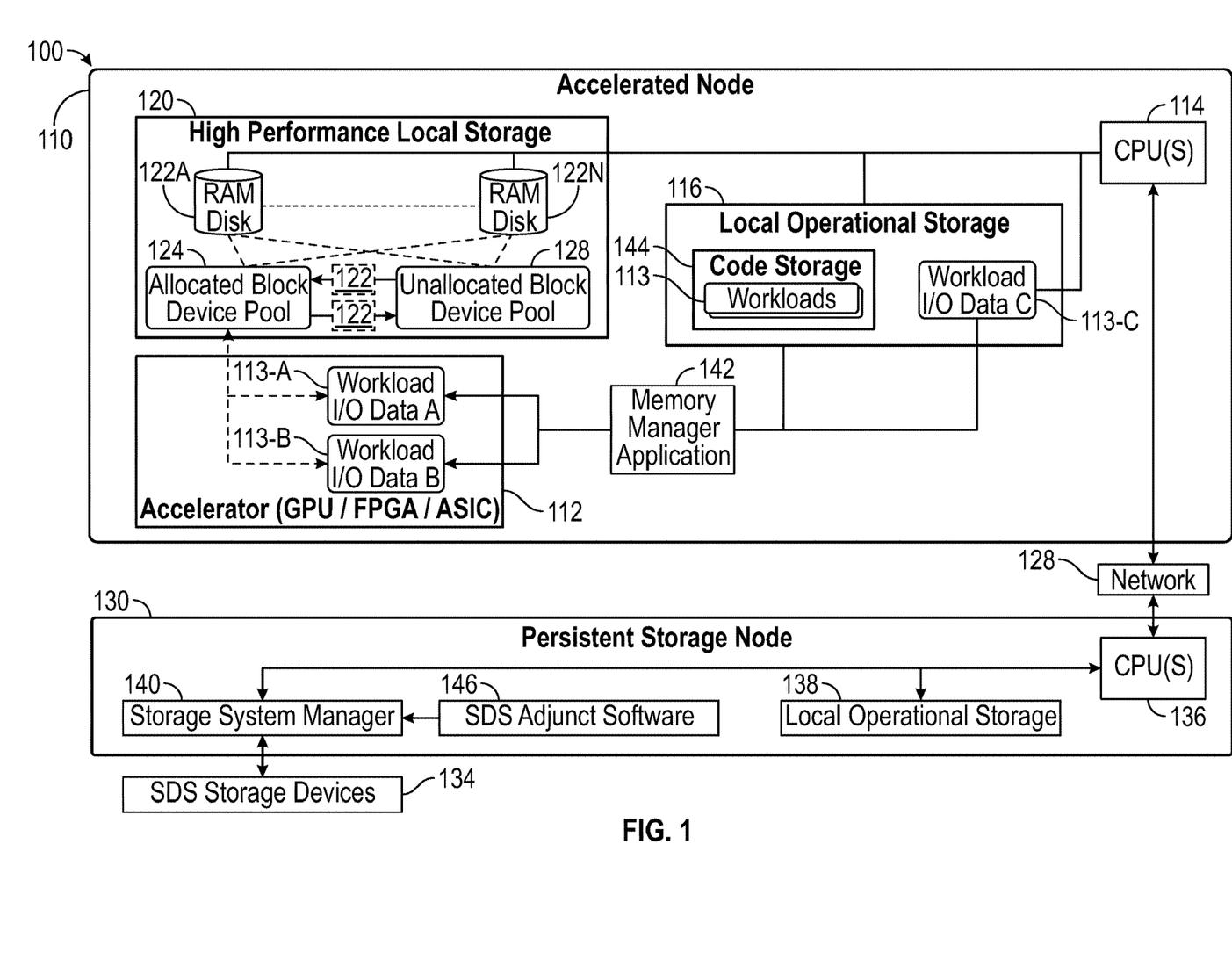
FIG. 1 is an illustration of an example system for selective use of high-performance memory in an SDS, according to embodiments of the present disclosure.

FIG. 1 is an illustration of an example system 100 for selective use of high-performance memory in an SDS, according to embodiments of the present disclosure. System 100 may be configured to provide processing acceleration system utilization with an SDS using a storage data placement algorithm. The algorithm may be implemented in any suitable manner and in any suitable entity of system 100. For example, the algorithm may be implemented, fully or in part, in a memory management application (MMA) 142, also referred to as a memory management circuit. MMA 142 may be implemented by instructions for execution by a processor, analog circuitry, digital circuitry, control logic, digital logic circuits programmed through hardware description language, application specific integrated circuits (ASIC), field programmable gate arrays (FPGA), programmable logic devices (PLD), or any suitable combination thereof, whether in a unitary device or spread over several devices. For example, MMA 142 may be implemented by instructions stored in a non-transitory medium such as a memory that, when loaded and executed by a processor such as CPU 114 (or any other suitable process), cause the functionality of MMA 142 described herein. In one embodiment, MMA 142 may be implemented within a node, such as accelerated node 110, for which MMA 142 is configured to determine selective use of high-performance memory for use in conjunction with an SDS.

MMA 142 may be configured to evaluate how to execute any suitable instructions, scripts, data, or other information, such as code 144. Code 144 may include various workload data sets 113. Workload data sets 113 may specify any suitable set of instructions, operations, calculations, or other computer or electronic device processing actions. Workload data sets 113 may include workload input or output data. In particular, in an accelerated node 110, MMA 142 may determine whether to have a given workload data set 113 executed by a CPU 114 of accelerated node 110 or in a hardware accelerator 112 of accelerated node 110. Accelerated node 110 may be implemented in any suitable manner, such as by a server, blade, microcontroller, computer, or other suitable electronic device. MMA 142 may be configured to make such determinations in a just in time manner wherein MMA 142 is implemented within accelerated node 110, or wherein MMA 142 performs such determinations on code 144 before code 144 is loaded onto accelerated node 110. In such a case, MMA 142 may be implemented in other suitable entities other than accelerated node 110.

Hardware accelerator 112 may be implemented in any suitable manner, such as by analog circuitry, digital circuitry, control logic, instructions for execution by a processor, digital logic circuits programmed through hardware description language, ASICs, FGPAs, PLDs, or any suitable combination thereof, whether in a unitary device or spread over several devices. Although a single hardware accelerator 112 is shown in FIG. 1, accelerated node 110 may include any suitable number and kind of hardware accelerators 112. A given hardware accelerator 112 may include, for example, a graphics processing unit (GPU) microprocessor, digital signal processor (DSP), ray-tracing hardware, field-programmable analog array, sound processors, network on a chip, network interface controllers, cryptographic accelerators, secure crypto processors, artificial intelligence (AI) accelerators, data compression accelerators, or a system-on-a-chip. A GPU may be used as an example implementation in the present disclosure.

Hardware acceleration 112 may utilize high performance (HP) memory such as HP local storage 120 that is separate from other, general purpose memory such as local operational storage 116 to be used by CPU 114 operations. HP local storage 120 may be implemented in any suitable manner. HP local storage 120 may include any suitable number and kind of high performance memory units, such as RAM disks. MMA 142 may overcome some drawbacks by causing hardware accelerator 112 to read and write to memory such as HP local storage 120, and addressing issues arising from attempts to back up contents written to HP local storage 120, such as requiring a manual seed process or losing data when HP local storage 120 is powered down, or creating bottlenecks to read and write from HP local storage 120 to an SDS system.

MMA 142 may be configured to add memory from HP local storage 120 to an SDS in any suitable manner according to the present disclosure.

The SDS may be implemented within any suitable portion of system 100. For example, the SDS may be implemented in a persistent storage node 130. Node 130 may be implemented in any suitable manner, such as by a server, blade, microcontroller, computer, or other suitable electronic device. Node 130 may include SDS storage devices 134 for storing contents, or SDS storage devices 134 may be located remotely over a network on any suitable nodes communicatively coupled to node 130. Node 130 may include any suitable number and kind of CPUs 132 or processors, and memory such as RAM 138. Node 130 may include a storage system manager 140, which may be implemented in any suitable manner such as by instructions for execution by a processor such as CPUs 132. Storage system manager 140 may be configured to back up and replicate data as instructed or requested by, for example, MMA 142 or other clients.

The SDS implemented by storage system manager 140 and SDS storage devices 134 may be used to add resilience to a storage architecture. One function of such an SDS is to create backup copies and distribute them throughout the available storage in SDS storage devices 134 with redundancy. These replicated data sets are created when the user data is presented to storage system manager 140. This may result in a primary data instance being created, along with additional replicated copies. However, the speed at which the primary and replicate copies are created may be limited by the slowest hardware storage device used within the SDS system to contain the replicated copies. Therefore, if a high speed RAM-backed block storage device, such as a portion of high performance local storage 120, is included in the SDS pool, the performance of high performance local storage 120 to read and write to backups may be limited by the other hardware devices that are part of the data replication process, such as SDS storage devices 134, which may be much slower, and as a result data can only be transferred in and out of high performance local storage 120 at the same speed as it can be replicated. As new data is input to high performance local storage 120 from, for example, hardware accelerator 112, such data would be replicated to the much slower SDS storage devices 134, throttling the performance of high performance local storage 120.

In order to allow data from high performance local storage 120 to be backed up in the SDS system, MMA 142 may cause blocks or block devices of high performance local storage 120 to be added to the SDS system. Moreover, in one embodiment, to allow such blocks or block devices of high performance local storage 120 to operate in its high-speed fashion so as to support to the operation of hardware accelerator 112, MMA 142 may both temporarily prevent SDS replication and prevent external data being written to it.

The SDS system may aggregate a set of physical storage medium devices into a pool of assets. Storage system manager 140 may control which devices are used and how the data is distributed. In order to increase or decrease the number of storage devices, commands may be used to add or remove devices to or from the SDS asset pool. Typically, these commands are accompanied by the physical installation or removal of storage media device hardware. Typically, it is assumed that a given storage media device added to the SDS system will remain part of the available storage until there is a performance issue, device failure, or upgrade. In contrast, MMA 142 may be configured to temporarily add storage devices to the SDS pool, such as those from high performance local storage. Such storage medium devices may be made available in the SDS pool for only a short period of time. High speed local storage may be partitioned into multiple RAM disks 122. Moreover, block devices for the SDS pool may be constructed from available RAM disks in non-volatile high speed memory, so no physical installation might be required. Each block device may be uniquely allocated to a single RAM disk.

As mentioned earlier, the SDS application of SSM 140 may not have the required functionality to provide the integration services necessary for allocated block device pool 124. These services may include the ability to allow an external entity—such as MMA 142—to prevent replication of primary data, prevent other external, or foreign, replicates from being stored in allocated block device pool 124. or other such operations. A separate adjunct software 146, e.g. a plug-in, may provide these capabilities within the SDS system. In addition to providing these additional functions, SDS adjunct software 146 can also supply specific configuration data to SSM 140 to support ingestion of block devices that are in HP storage 120. This data may be provided from a profile, loaded at boot time, of a given memory block. The profile may include, for example for a Ceph SDS application:

directory=.libs
k=1
m=2
stripe_unit=4K
plugin=HPRAM_Sync
control_replication=true
prevent_foreign_replicas=true
retain_final_data=true
crush-failure-domain=osd
technique=HPRAM_Sync
crush-device-class=accelerated_host_ram
where:

| | |
|---|---|
| directory: | Where to load profile from. |
| k: | Number of data chunks. Set to number of RAM devices on the single node. |
| m: | Number of coding chunks to eventually offload. Set to at least 1 greater than k number. |
| stripe_unit: | Block size of workload. |
| plugin: | Coding profile to use, in this case HPRAM_Sync with associated attributes to define additional functions, such as: |
| control_replication: | allow external entity to control data replication |
| prevent_foreign_replicas: | No replicas from other primary block devices |
| retain final data: | This will instruct the SDS application to retain replicas of a block device before is is deallocated. If set to true a copy of the |

| | |
|---|---|
| | final block device image will be replicated. If false, it will not. |
| crush-failure-domain: | All multiple data chunks to live on the same host, so in this case OSD rather than the normal host. |
| technique: | Name of adjunct software to be used by the SDS application |
| crush-device-class: | Free-form text representing the tagged RAM-backed disks. |

Accelerated node 110 can be added to an existing SDS containing any suitable number of permanent storage nodes 130. Accelerated node 110 may communicate with permanent nodes 130 using network 128. Persistent storage node 130 may use CPU 132 and RAM 138 to implement the SDS. Accelerated node 110 may use MMA 142, CPU 114, and local operational storage 116 to provide a subset of the SDS as needed.

Each of RAM disks 122 may be used to create block devices for data produced by workload data sets 113. Initially, block devices might not be allocated to any workload and may reside in an unallocated block device pool 228. When a block device is allocated to a workload 213, the block device may be moved into an allocated block device pool 124. Further, once allocated, the associated workload data set 113 may be written to and read from by its workload process using workload code 114.

Data written into workload data set 113 may be seeded when high performance local storage 120 is joined to the SDS. High performance local storage 120 may be joined to the SDS by MMA 142, which may employ data placement algorithm rules, executed by MMA 142 that allocate a block device from unallocated block device pool 128 to workload data sets 113A and 113B for read and write access. This effectively moves the block device from unallocated block device pool 128 to allocated block device pool 124.

Storage system manager 140 may be configured to distribute additional copies of data objects throughout SDS storage devices 134 based on storage data placement algorithm rules. In this manner, data from execution of workloads 113 can be retained with SDS storage devices 134 even after the workload has finished with the data and allocated block devices 124 are decoupled from persistent storage node 130. A minimum number of copies may be kept to meet data resiliency, such as three copies in SDS storage devices 134.

Conversely, accelerated node 210 and MMA 142 can instruct storage system manager 140 to suspend replication services for the seeded data in high performance local storage 120 using allocated block devices 124. This may remove the constraint that high performance local storage 120 performs at the same operation level as the SDS storage device 134 that contains its replicas. As mentioned earlier, an SDS may create replicas of data written to the primary block storage device. These replicas may be written to other block storage devices within the SDS. This may result in block storage devices containing primary data provided by an external process as well as replicated data from other primary sources. If a block device is removed from an SDS system, then not only is access lost to the primary data, but the replicas of other primary data sources may also be lost. The SDS may, as a result to maintain resiliency, be forced to create new replicas in other blocks to replace the ones it has lost. To prevent this, MMA 142 may instruct storage system manager 140 that no replicas can be added to RAM backed blocked devices in HP local storage 120. This will prevent the need to relocate any replicas from RAM backed blocked devices when such devices are removed from the SDS.

When SDS replication is suspended, read performance of high performance local storage 120 may be based on RAM performance of RAM disks 122 alone, and not upon the replicated slower SDS storage devices 134 wherein storage data placement algorithm rules of SDS force all placement groups making up the data objects to use the RAM-backed storage as the primary acting device. Such rules may otherwise specify that high performance local storage 120 is to be used in a data pool and replicate data from other nodes, as a part of SDS storage devices 134. MMA 142 may suspend such rule through commands of embodiments of the present disclosure.

Similarly, write performance of high performance local storage 220 may be based on RAM performance of RAM disks 122 alone, and not the replicated slower storage destinations of SDS storage devices 134 based on two factors. First, data being written to the block device may be prohibited while it is being replicated. This may prevent the SDS from getting into a situation where it cannot replicate data as fast as it is being created. Second, as mentioned earlier, the SDS may otherwise use the block device to store replicas from other primary sources. This would also prevent data being written to the block device.

This may enable overall storage capacity for results of workloads 113 to be stored not only in HP local storage 120, but in the overall SDS, allowing for easy usage of an exabyte-scale storage system when performance is no longer necessary, when processing is complete and data is to be archived.

Once a block device has been created from a RAM disk and allocated to a workload data set 113, additional processing must be completed before it can be added to the SDS pool of SDS storage devices 134. This may include assigning attributes to the block storage device that include, prevention of replication, prevention of replicas being written to the device, and other such attributes. Further, an SDS may also have object storage system bootstrap parameters that are applied to any storage device prior to joining a cluster. These attributes may provide a source for the conditions under which the block device can be added to the SDS pool of SDS storage devices 134. When the workload has finished with the block device it may be removed from the SDS pool of SDS storage devices 134. However, the attributes may still be attached to the block device. The result is a device that only needs to be allocated and does not need any processing prior to joining the SDS pool of storage devices 134. Such a block device may be defined as unallocated and may be added to unallocated block device pool 128.

Node 110 containing hardware accelerator 112 may boot to a working state such that node 110 has an operating environment and network connectivity using any suitable method, such as PXE (Preboot eXecution Environment) or a local boot from local operation storage 116. Node 110 may join an existing storage cluster, such as the SDS system provided by node 130, by any suitable method. As a result, node 110 may include a static configured data used to preprocess RAM backed block device that is local to node 110 or preconfigured in a boot image provided by, for example, a network boot mechanism. The system may instead use a dynamic configuration, including discovery or pull of object storage system bootstrap parameters from the existing static node(s). These parameters may include a set of block device profiles. These may be used to configure block devices when they are created.

To allow accelerated node 110 to join persistent node 130 in the SDS system, block devices for object storage are created in using RAM disks 122. Multiple block devices may need to be created to address multiple workloads executing simultaneously. Optionally, this may be performed for the number of logical CPU threads available to the system, within the system resource limitations. Initially, the block devices may be added to unallocated block device pool 126. This may be performed by MMA 142 or storage system manager 140.

Memory allocation application 142 may check whether existing block devices in non-volatile RAM in pools 128, 124 match an expected storage system configuration for use of such block devices in the SDS system. If the configuration matches, then the process of attaching the block storage device to the SDS system may continue. These block devices have been previously created but are no longer in use i.e. in unallocated block storage pool 128. Otherwise, the block device may be wiped and the process for using RAM disks 122 as storage in SDS, discussed above, may be performed This may be the equivalent of bringing volatile RAM online.

Object storage devices may be added to existing SDS storage clusters using any suitable prescribed storage method, defined by storage system manager 140, of ingesting new block storage devices for object storage purposes. Under standard implementations, storage system manager 140 controls when replication is used or not on a specific object store. However, in one embodiment, MMA 142 may control replication of data of HP local storage 120 that has attached to the SDS system by informing storage system manager 140 to allow or not allow replication. This includes preventing replicas from other primary sources being located on the block device. This may be performed by use of commands issued from MMA 142 to storage system manager 140. When MMA 142 adds block devices from HP local storage 120 to SDS storage devices 134, MMA 142 may create a storage class to tag the newly added storage as self-determinative as to replication to signify the ability for MMA 142 to control replication. The tag and replication attribute may be contained in the block storage device profiles retrieved during the boot process.

SDS storage devices 134 may be implemented using, for example, hardware storage devices, hard drives, or SSDs. Such storage devices may be provisioned by system storage manager 140 and then added to the SDS storage of the SDS system. However, since RAM-backed storage devices such as RAM disks 122 are being used, MMA 142 may create the ephemeral block storage of HP local storage 120. Further, MMA 142 can also add the block storage to the SDS system. This can be accomplished using an API call from MMA 142 to storage system manager 140.

The storage data placement algorithm rules for storage system manager 140 may be created that force all placement groups making up the data objects for hardware accelerator 112 to use the RAM-backed storage of HP local storage 120 as the primary acting device. The storage data placement group can also be instructed to only allow data from accelerator 112 to write data to the primary acting devices of HP local storage 120, blocking, for example, replication writes from other elements of SDS storage devices 134. This may ensure that execution of a workload 113 by accelerator 112 can write to any section of the RAM-backed storage of HP local storage 120 without, for example, user data from other parts of the SDS application being written therein. Data may flow selectively, and upon specified commands, from HP local storage 120 to SDS storage devices 134 in persistent storage nodes 130 as no other user data can be written to HP local storage 120.

A given workload data set 113 may be created, amended, or assigned to utilize the storage pool (that is, HP local storage 120 or SDS storage devices 134) matching the storage data placement algorithm rules created in the prior step. MMA 142, using an API call from accelerated node 110 to a storage system manager 140, can selectively control the replication of RAM-backed data in HP local storage 120. If replication is disabled, storage system manager 140 may instruct persistent storage n ode 130 to halt any data replication from the RAM-backed storage of HP local storage 120 to the associated storage devices in SDS storage devices 134. This may be done to ensure that the performance of the Persistent Storage node is not unduly degraded due to the high speed data rates sustained by the workload application. Conversely, MMA 142 may enable replication for a given workload 113 using an API call made from accelerated node 110 to storage system manager 140 to allow replication from HP local storage 120 to SDS storage devices 134 in persistent storage node 130.

Once ultra high speed performance is no longer required of the RAM-backed block device, the storage pool class of the block device of HP local storage 120 may be updated to trigger the movement of data from RAM-backed storage of HP local storage 120 to slower bulk storage of SDS storage devices 134. This may include MMA 142 using an API to storage system manager 140 to control the reallocation of the RAM-storage block back to the overall storage pool controlled by system storage manager 134. When the high speed storage is no longer required by the assigned workload 113, MMA 142 may use an API call to indicate that the existing data is retained or all copies can be removed from the SDS storage of SDS storage devices 134. If copies of the data are removed from HP local storage 120 or if the associated block is removed from HP local storage 120, the SDS storage system may create an additional replication as part of its normal operation. Finally the data in the associated block device is erased, or drained. The block device may be moved from allocated block device pool 124 to unallocated block device pool 128.

Figure 2:
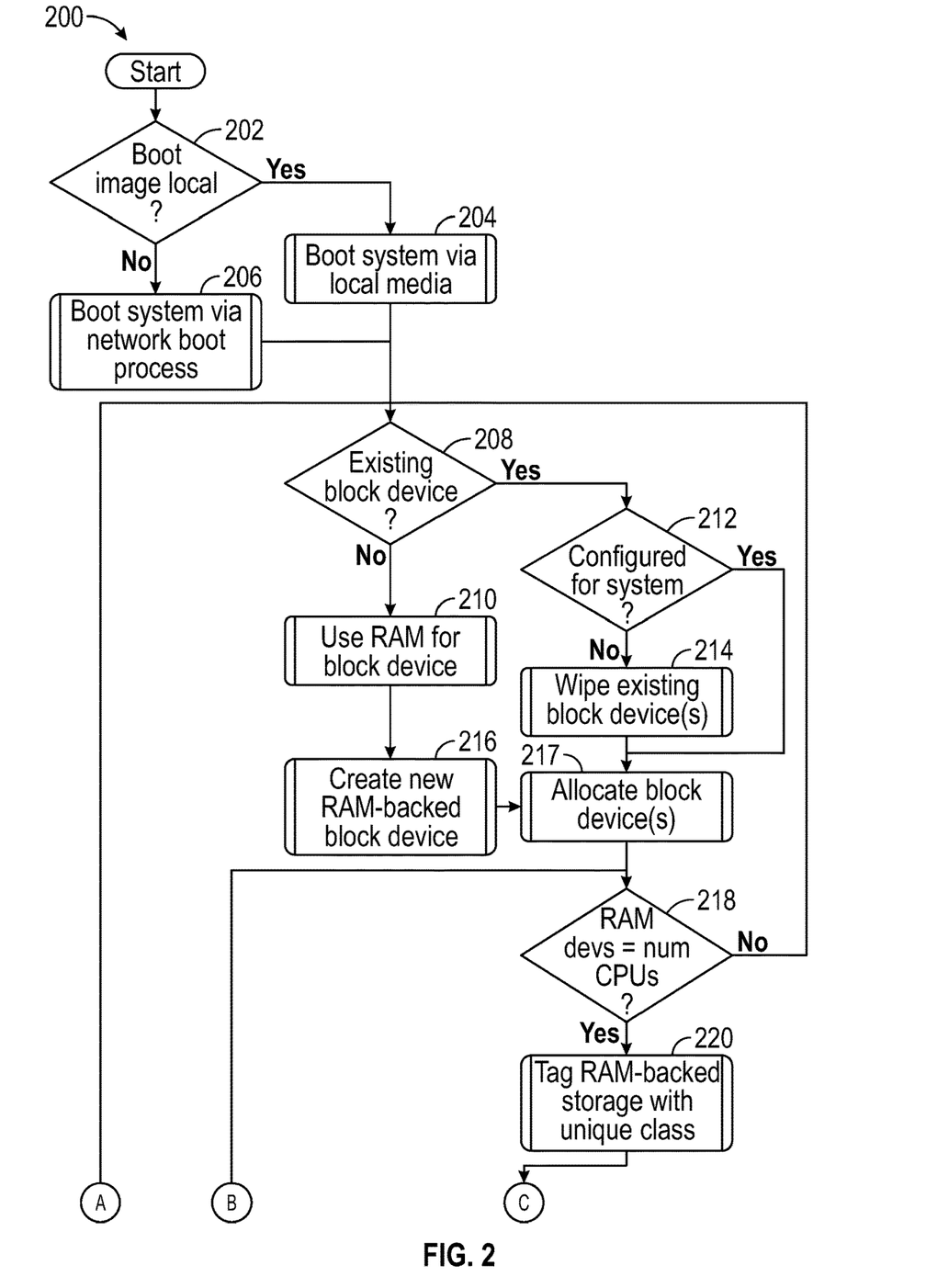
FIG. 2 is an illustration of an example method for selective use of high-performance memory in an SDS, according to embodiments of the present disclosure.

FIG. 2 is an illustration of an example method 200 for selective use of high-performance memory in an SDS, according to embodiments of the present disclosure. Method 200 may be implemented by any suitable entity, such as by MMA 142 or storage system manager 140 of FIG. 1, or any other suitable portion of FIG. 1. Method 200 may be performed with more or fewer steps than shown in FIG. 2. The steps of method 200 may be performed in the illustrated order or reordered in any suitable manner. Various steps of method 200 may be omitted, repeated, or performed recursively. Multiple instances of method 200 may be performed at once.

At step 202, accelerated node 110 may begin the process of joining an SDS made up of an existing persistent storage node or nodes 130. Initially, accelerated node 110 may determine whether there is a local boot image. If so, method

200 may proceed to step 204. Otherwise, method 200 may proceed to step 206. A set of block device profiles may be retrieved at this point.

At step 204, accelerated node 110 may begin the boot process from local media as part of static configuration. This can include media that is preconfigured and stored in RAM 116 via network 120 via a network boot mechanism. Method 200 may proceed to step 208.

At step 206, accelerated node 110 may begin the boot process from a boot image from the existing environment via a network connection using network 120.

At step 208, accelerated node 110 may check for the presence of an existing unallocated block device in unallocated block device pool 126. If such an unallocated block device is present, method 200 may proceed to step 212. Otherwise, method 200 may proceed to step 210.

At step 210, a portion of HP local storage 120 can be used to create a RAM-backed block device. Once created, it may be added to unallocated block device pool 126. Method 200 may proceed to step 216.

At step 212, accelerated node 110 may determine if the existing unallocated block device configuration matches an expected value, and thus correctly configured for the system. For example, it may verify that the storage system UUID in the metadata of the device being checked matches the UUID of the existing cluster. These would be available from the unallocated block device pool 126. If it does match, method 200 may proceed to step 218. Otherwise, method 200 may proceed to step 214.

At step 214, accelerated node 110 may select an available block device from unallocated block device pool 126. Once selected, all existing data will be completely erased from the block device. Method 200 may proceed to step 217.

At step 216, accelerated node 110 may create or configure a new RAM backed block device using the profile obtained in step 202. Once created, the block device will be added to unallocated block device pool 128.

At step 217, MMA 142 may allocate the block device to a specific workload. This may effectively move the block device from unallocated block device pool 128 to allocated block device pool 124.

At step 218, accelerated node 110 may determine if enough block storage has been created for the workload 113 for which the request is made. Accelerated node 110 may evaluate the number of CPU threads that will be required by the requesting workload 113. Accelerated node 110 may then divide the amount of storage available in HP local storage 120 by the number of CPU threads to determine the number of block storage devices required. If the number of block devices created is equal to or greater than the number required, then method 200 may proceed to step 220. Otherwise, method 200 may proceed to step 208 to create and allocate additional block storage devices.

At step 220, accelerated node 110 may create a unique storage class, defined by the associated profile, within the existing SDS application. The previously created object device may be assigned this new storage class. This class will be constituted such that only locally sourced data from accelerator 112 can be written to High Performance local storage 120, thus preventing any other user data from corrupting the data created from executing an associated workload 113. Using the example profile this storage class would be defined by the element "crush-device-class=accelerated_host_ram"

At step 222, accelerated node 110 may instruct storage system manager 140 with storage rules for the new block device. These rules may be contained within the block device profile. This may prevent storage system manager 140 from writing any data to the new block device. Further, this may also allow selective replication of block device data. Here are the storage rules as defined by the profile example outlined earlier.

k=1
m=2
stripe_unit=4K
plugin=HPRAM_Sync
crush-failure-domain=osd
technique=HPRAM_Sync
crush-device-class=accelerated_host_ram At step 224, accelerated node 110 may allocate workload 113 utilizing the storage pool matching the storage data placement algorithm rules created in the prior step. When data replication is disabled, as defined by SDS adjunct software attributes "control_replication" & "prevent_foreign_replicas", High Performance local storage 120 may be able to operate with its highest access speed without limit caused by replicate storage media devices 140.

At step 226, accelerated node 110 may issue a command, using network 128, to storage system manager 140. This command may request that the new block device is processed by storage system manager 140 using the prescribed method of ingesting new block storage devices for object storage purposes plus the parameters defined in steps 220-224. Once completed, storage system manager 140 may create data replicas of the new block device in SDS storage pool 134. In addition, storage system manager 140 may use additional functionality provided by SDS Adjunct Software 146, such as HPRAM_Sync At step 228, accelerated node 110 may determine if a total workload has increased since the latest block storage device was added. The increase can be due to new block device requirements from an existing workload 113 or a new workload 113. If there is such an increase, method 200 may proceed to step 230. Otherwise, method 200 may proceed to step 232.

At step 230, accelerated node 110 may determine if a new block device has been requested by accelerator 112. If so, method 200 may proceed to step 208 because a new RAM-backed block storage device may be needed. Otherwise, method 200 may proceed to step 218 to evaluate the need for a new RAM-backed storage device.

At step 232, storage system manager 140 may detect if a storage release request has been issued by accelerator 112, from a given workload 113. If one is detected, then method 200 may proceed to step 234. Otherwise, method 200 may proceed to step 237.

At step 234, storage system manager 140 may, once the data is no longer necessary on the RAM backed block device, begin the process of draining the data in HP local storage 120. If the release request also contains an instruction to retain the data (e.g. retain_final_data=true), defined in the block device profile, then a backup copy may be created in storage devices 134. This may be in addition to the replicates that persistent storage node would have previously created as part of the normal operation of the SDS application. Once the replication is complete, the block device data can be removed from the RAM-backed block device. If the data does not require a final image, the block device data can be removed from the RAM-backed block device.

At step 236, storage that has been released may be added to unallocated block device pool 126 such that it can be reallocated for other applications.

At step 237, if control_replication=true, storage system manager 140 may detect if a replication state change has been requested by accelerator 112. A replication state change has been requested, then the replication state for the ram backed block device will be changed. If the replication state is currently set to "no replication" then the replication state will be changed to "allow replication". Alternatively, if the replication state is currently set to "allow replication" then the replication state will be changed to "no replication". In the case where the replication state is changed to "no replication", the state change may take effect at the end of any current replication operation on the block device. If control_replication=false, no action might be taken by storage system manager 140 in step 237.

At step 238, accelerated node 110 may determine if there are any active workloads using HP local storage 220. If there are still active workloads, then method 200 may proceed to step 228. Otherwise, method 200 may proceed to step 240.

At step 240, accelerated node 110 may determine if any HP local storage 120 is still allocated to an inactive workload. If there are, then method 200 may proceed to step 228. Otherwise all reallocation of storage may have been completed.

Embodiments of the present disclosure may include an apparatus. The apparatus may include an interface to a plurality of non-volatile memory configured to receive results of a hardware accelerator. The apparatus may include a memory management circuit.

The memory management circuit may be implemented by instructions for execution by a processor, analog circuitry, digital circuitry, control logic, digital logic circuits programmed through hardware description language, FPGA, PLC, ASIC, or any suitable combination thereof, whether in a unitary device or spread over several devices.

The memory management circuit may configured to access the plurality of non-volatile random access memory (NV-RAM), access an SDS wherein the SDS is to manage replication of data across a cluster of memory devices, generate a block device from the plurality of NV-RAM, determine that the block device is to be used to receive results of the hardware accelerator, determine that the results of the hardware accelerator as stored in the block device are to be replicated in the SDS, and, based on a determination that the results of the hardware accelerator as stored in the block device are to be replicated in the SDS, configure the block device for use with the SDS. The block device may be configured to be included by the SDS in the cluster of memory devices and be controlled by the memory management circuit after inclusion in the cluster of memory devices.

In combination with any of the above embodiments, the memory management circuit may be further configured to communicate with an SDS manager application of the SDS system to add the block device to the cluster of memory devices.

In combination with any of the above embodiments, the memory management circuit may be further configured to configure the block device to be replicated by an SDS manager application of the SDS system while retaining selective control by the memory management circuit for access to and replication of the block device.

In combination with any of the above embodiments, the memory management circuit may be further configured to selectively control access to the block device by an SDS manager application of the SDS system.

In combination with any of the above embodiments, the memory management circuit may be further configured to erase the block device after the block device has been added to the cluster of memory devices.

In combination with any of the above embodiments, the memory management circuit may be further configured to, upon completion of a workload by the hardware accelerator and storage of contents of the completion of the workload in the block device, determine whether to retain or erase the contents of the completion of the workload in the cluster of memory devices of the SDS.

In combination with any of the above embodiments, the memory management circuit may be further configured to, upon a determination to retain the contents of the completion of the workload in the cluster of memory devices of the SDS, mark the block device as a primary source for replication in the cluster of memory devices of the SDS.

In combination with any of the above embodiments, the memory management circuit may be further configured to, upon a replication of at least one complete copy of the contents of the completion of the workload in the cluster of memory devices of the SDS from the block device, remove the block device as a source for replication of the at least one complete copy of the contents of the completion of the workload in the cluster of memory devices.

In combination with any of the above embodiments, the memory management circuit may be further configured to mark the block device with an attribute to allow control by the memory management circuit after ingestion of the block device into the cluster of memory devices of the SDS.

In combination with any of the above embodiments, the memory management circuit may be further configured to selectively enable or disable replication of contents of the block device by an SDS manager application of the SDS system after the block device has been ingested into the cluster of memory devices of the SDS.

In combination with any of the above embodiments, the memory management circuit may be further configured to selectively enable or disable data access of the block device by an SDS manager application of the SDS system after the block device has been ingested into the cluster of memory devices of the SDS.

In combination with any of the above embodiments, the memory management circuit may be further configured to block replication of data of other elements of the cluster of memory devices of the SDS after the block device has been ingested into the cluster of memory devices of the SDS.

Although example embodiments have been described above, other variations and embodiments may be made from this disclosure without departing from the spirit and scope of these embodiments.

What is claimed is:

1. An apparatus, comprising:
   an interface to a plurality of non-volatile random-access memory (NV-RAM) configured to receive results of a hardware accelerator; and
   a memory management circuit configured to:
      access the plurality of non-volatile random access memory;
      access a software-defined-system (SDS), the SDS to manage replication of data across a cluster of memory devices;
      generate a block device from the plurality of NV-RAM;
      determine that the block device is to be used to receive results of the hardware accelerator, the hardware accelerator to create the results from execution of a workload, the results from execution of the workload to be replicated in the SDS in at least one other storage location;

determine that the results of the hardware accelerator as stored in the block device are to be replicated in the SDS;

based on a determination that the results of the hardware accelerator as stored in the block device are to be replicated in the SDS, configure the block device for use with the SDS, the block device configured to be included by the SDS in the cluster of memory devices and be controlled by the memory management circuit after inclusion in the cluster of memory devices; and configure the block device to be replicated by an SDS manager application of the SDS system while retaining selective control by the memory management circuit for access to and replication of the block device, including to:

cause one or more workloads to be loaded into the hardware accelerator for execution and the results from the one or more workloads to be stored in the block device as part of the SDS;

during execution of the one or more workloads and storing of the results into the block device, turn off replication of the block device in the SDS while maintaining the block device as part of the SDS; and upon completion of execution of the one or more workloads and storing of the results into the block device, turn on replication of the block device in the SDS.

2. The apparatus of claim 1, wherein the memory management circuit is further configured to communicate with an SDS manager application of the SDS system to add the block device to the cluster of memory devices.

3. The apparatus of claim 1, wherein the memory management circuit is further configured to configure the block device to be replicated by an SDS manager application of the SDS system while retaining selective control by the memory management circuit for access to and replication of the block device.

4. The apparatus of claim 1, wherein the memory management circuit is further configured to selectively control access to the block device by an SDS manager application of the SDS system.

5. The apparatus of claim 1, wherein the memory management circuit is further configured to erase the block device after the block device has been added to the cluster of memory devices.

6. The apparatus of claim 1, wherein the memory management circuit is further configured to, upon completion of a workload by the hardware accelerator and storage of contents of the completion of the workload in the block device, determine whether to retain or erase the contents of the completion of the workload in the cluster of memory devices of the SDS.

7. The apparatus of claim 6, wherein the memory management circuit is further configured to, upon a determination to retain the contents of the completion of the workload in the cluster of memory devices of the SDS, mark the block device as a primary source for replication in the cluster of memory devices of the SDS.

8. The apparatus of claim 7, wherein the memory management circuit is further configured to, upon a replication of at least one complete copy of the contents of the completion of the workload in the cluster of memory devices of the SDS from the block device, remove the block device as a source for replication of the at least one complete copy of the contents of the completion of the workload in the cluster of memory devices.

9. The apparatus of claim 1, wherein the memory management circuit is further configured to mark the block device with an attribute to allow control by the memory management circuit after ingestion of the block device into the cluster of memory devices of the SDS.

10. The apparatus of claim 1, wherein the memory management circuit is further configured to selectively enable or disable replication of contents of the block device by an SDS manager application of the SDS system after the block device has been ingested into the cluster of memory devices of the SDS.

11. The apparatus of claim 1, wherein the memory management circuit is further configured to selectively enable or disable data access of the block device by an SDS manager application of the SDS system after the block device has been ingested into the cluster of memory devices of the SDS.

12. The apparatus of claim 1, wherein the memory management circuit is further configured to block replication of data of other elements of the cluster of memory devices of the SDS after the block device has been ingested into the cluster of memory devices of the SDS.

13. The apparatus of claim 1, wherein the memory management circuit is further configured to selectively control access to the block device from the SDS after the block device has been ingested into the cluster of memory devices of the SDS based upon use of the hardware accelerator to execute the workload and store results into the block device.

14. A method, comprising:

accessing a plurality of non-volatile random access memory (NV-RAM);

from a memory management circuit, accessing a software-defined-system (SDS), the SDS to manage replication of data across a cluster of memory devices;

generating a block device from the plurality of NV-RAM;

determining that the block device is to be used to receive results of a hardware accelerator, the hardware accelerator to create the results from execution of a workload, the results from execution of the workload to be replicated in the SDS in at least one other storage location;

determining that the results of the hardware accelerator as stored in the block device are to be replicated in the SDS;

based on a determination that the results of the hardware accelerator as stored in the block device are to be replicated in the SDS, configuring the block device for use with the SDS, the block device configured to be included by the SDS in the cluster of memory devices and be controlled by the memory management circuit after inclusion in the cluster of memory devices; and configuring the block device to be replicated by an SDS manager application of the SDS system while retaining selective control by the memory management circuit for access to and replication of the block device, including:

causing one or more workloads to be loaded into the hardware accelerator for execution and the results from the one or more workloads to be stored in the block device as part of the SDS;

during execution of the one or more workloads and storing of the results into the block device, turning off replication of the block device in the SDS while maintaining the block device as part of the SDS; and upon completion of execution of the one or more workloads and storing of the results into the block device, turn on replication of the block device in the SD.

15. The method of claim 14, comprising communicating with an SDS manager application of the SDS system to add the block device to the cluster of memory devices.

16. The method of claim 14, comprising configuring the block device to be replicated by an SDS manager application of the SDS system while retaining selective control by the memory management circuit for access to and replication of the block device.

17. The method of claim 14, comprising selectively controlling access to the block device by an SDS manager application of the SDS system.

18. The method of claim 14, comprising erasing the block device after the block device has been added to the cluster of memory devices.

19. The method of claim 14, comprising, upon completion of a workload by the hardware accelerator and storage of contents of the completion of the workload in the block device, determining whether to retain or erase the contents of the completion of the workload in the cluster of memory devices of the SDS.

20. The method of claim 19, comprising, upon a determination to retain the contents of the completion of the workload in the cluster of memory devices of the SDS, marking the block device as a primary source for replication in the cluster of memory devices of the SDS.

21. The method of claim 20, comprising, upon a replication of at least one complete copy of the contents of the completion of the workload in the cluster of memory devices of the SDS from the block device, removing the block device as a source for replication of the at least one complete copy of the contents of the completion of the workload in the cluster of memory devices.

22. The method of claim 14, comprising marking the block device with an attribute to allow control by the memory management circuit after ingestion of the block device into the cluster of memory devices of the SDS.

23. The method of claim 14, comprising selectively enabling or disabling replication of contents of the block device by an SDS manager application of the SDS system after the block device has been ingested into the cluster of memory devices of the SDS.

24. The method of claim 14, comprising selectively enabling or disabling data access of the block device by an SDS manager application of the SDS system after the block device has been ingested into the cluster of memory devices of the SDS.

25. The method of claim 14, comprising blocking replication of data of other elements of the cluster of memory devices of the SDS after the block device has been ingested into the cluster of memory devices of the SDS.

26. The method of claim 14, comprising selectively controlling access to the block device from the SDS after the block device has been ingested into the cluster of memory devices of the SDS based upon use of the hardware accelerator to execute the workload and store results into the block device.

* * * * *